Figure 1:
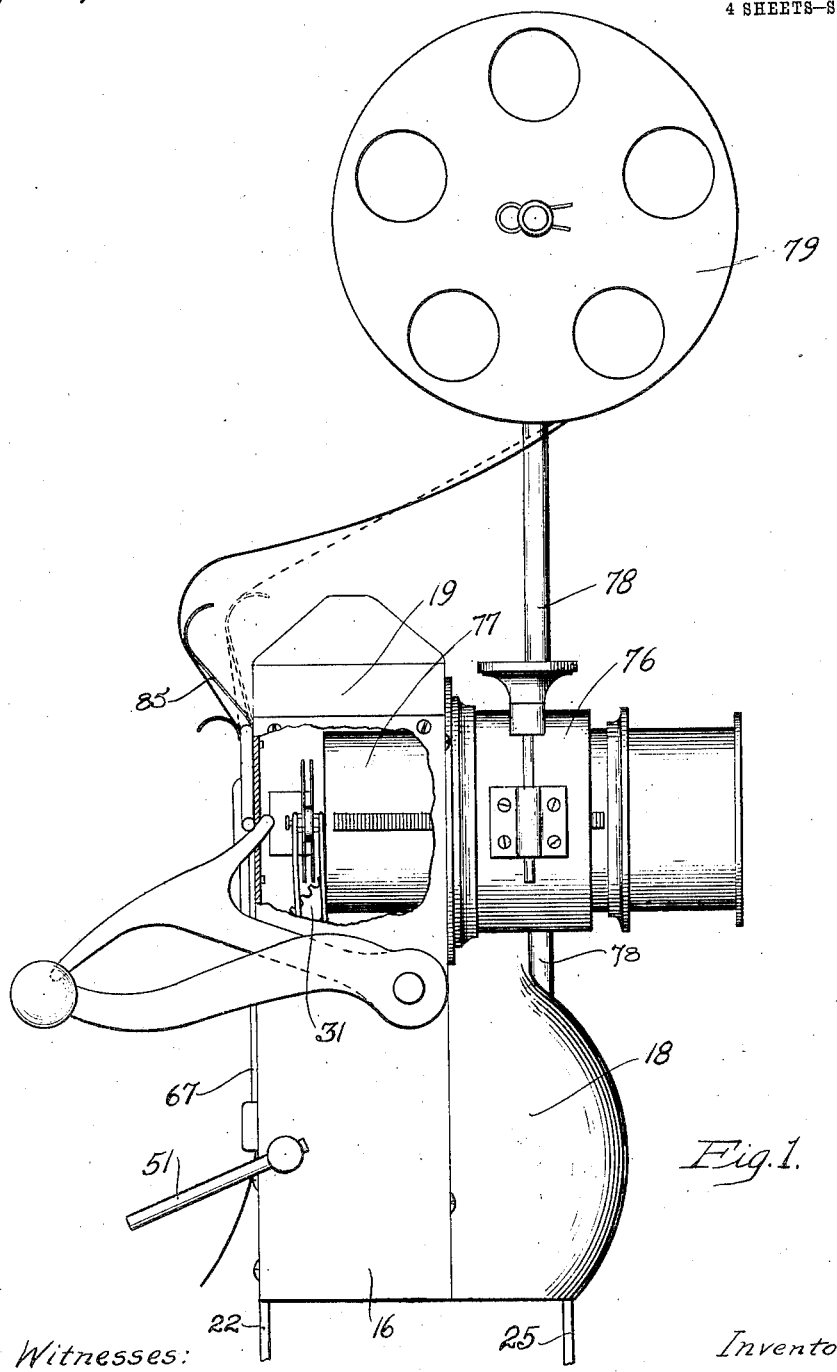

E. H. SPERBERG.
MOVING PICTURE MACHINE.
APPLICATION FILED SEPT. 10, 1910.

1,097,478.

Patented May 19, 1914.
4 SHEETS—SHEET 2.

Witnesses:
Ephriam Banning
Charles O. Shervey

Inventor:
Edward H. Sperberg.
By Banning & Banning
Attorneys.

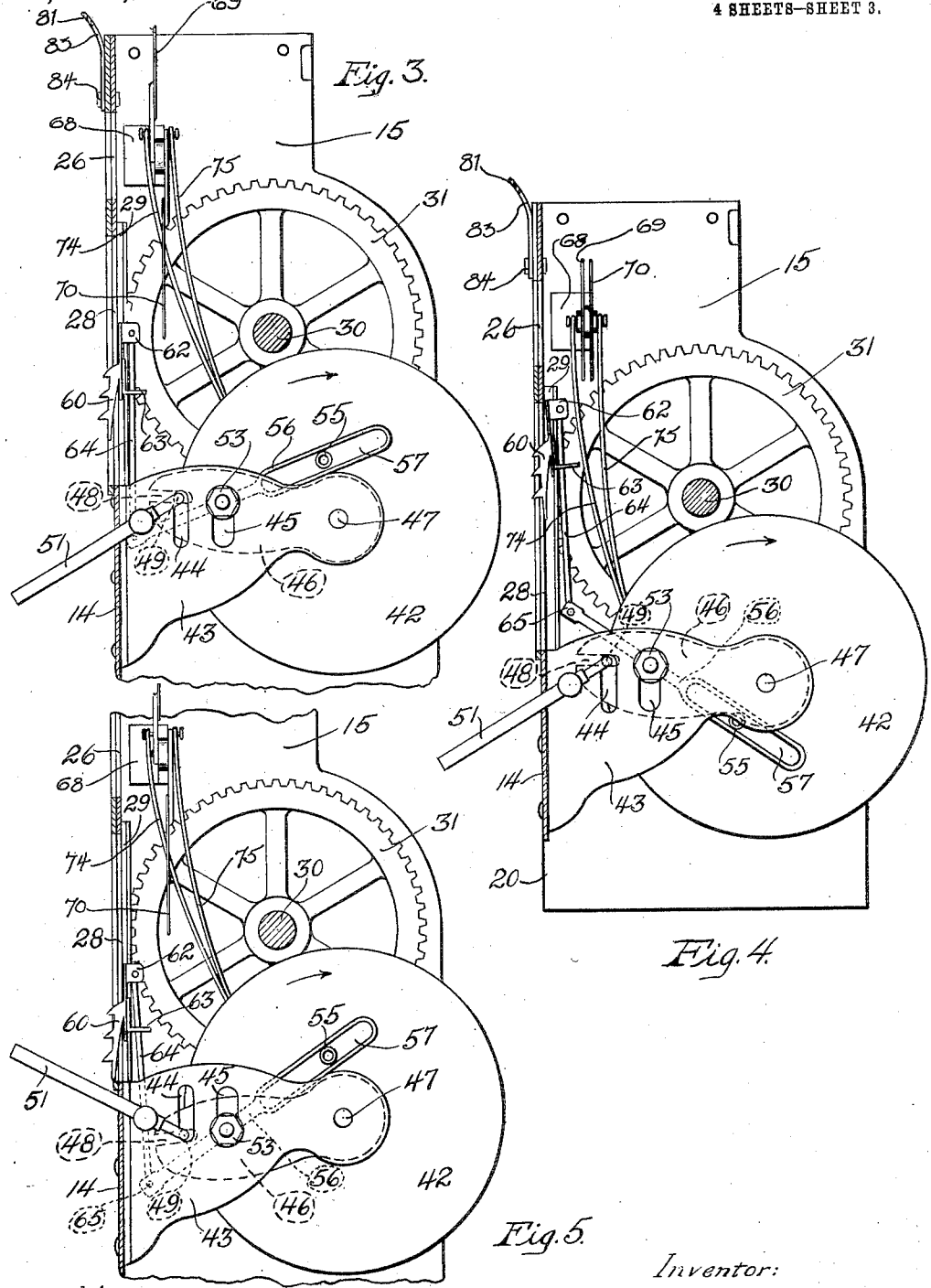

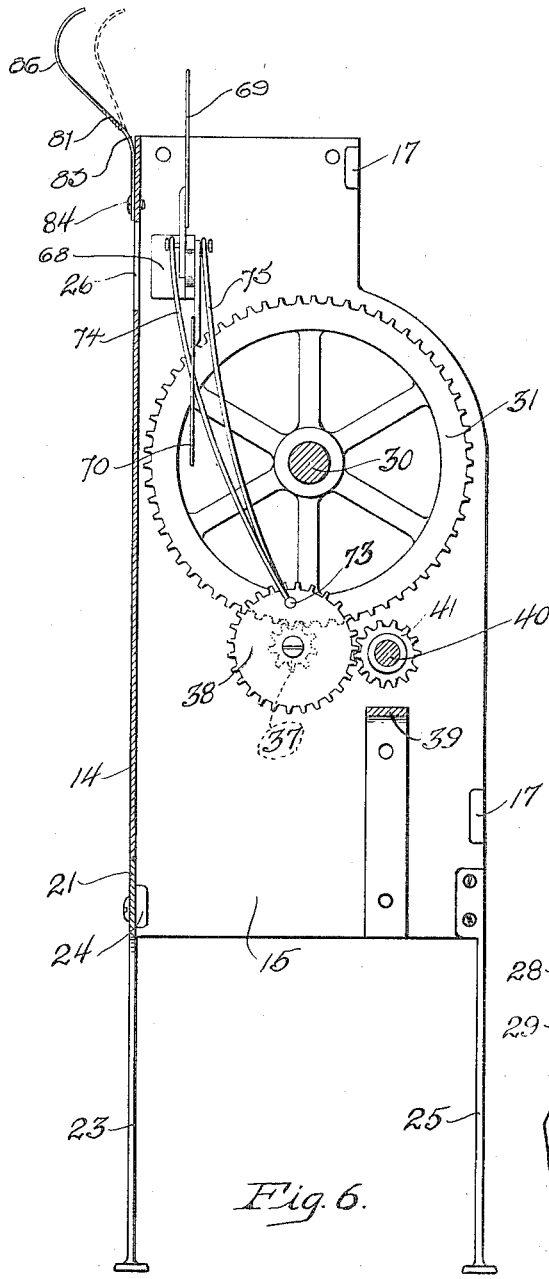
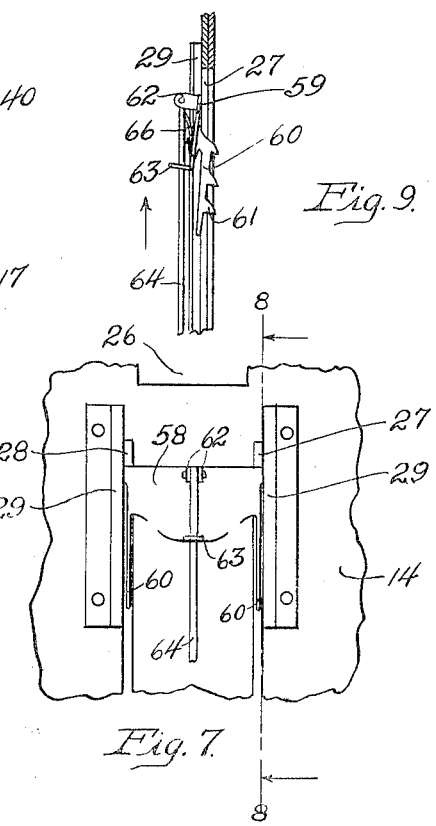

UNITED STATES PATENT OFFICE.

EDWARD H. SPERBERG, OF CHICAGO, ILLINOIS, ASSIGNOR TO OSCAR F. FOSS, OF CHICAGO, ILLINOIS.

MOVING-PICTURE MACHINE.

1,097,478. Specification of Letters Patent. Patented May 19, 1914.

Application filed September 10, 1910. Serial No. 581,415.

*To all whom it may concern:*

Be it known that I, EDWARD H. SPERBERG, a citizen of the United States, residing at Chicago, in the county of Cook and State of Illinois, have invented certain new and useful Improvements in Moving-Picture Machines, of which the following is a specification.

This invention relates to moving picture machines and has for objects the production of a machine intended particularly for use in the home. To this end it is desired to produce a machine of great compactness and simplicity so that all of its parts may be brought together within the smallest possible space and so that it may be cheaply built and will not become easily disarranged or injured when subjected to severe use. It is found that in the home where the services of expert operators are not available the machines are subject to particularly severe and trying usage. This is because they are not properly operated at times and because they are not properly cared for and attended to when out of service.

In order for the machine to be a success for home use it must be of pleasing appearance; it must be well designed, and proportioned externally and must not be unduly large nor heavy. It must be of great simplicity, because complexity of design and operation tend to confuse and this is particularly true when the operator is not an expert. Furthermore the machine should be provided with suitable safety appliances so that danger from fire will be minimized. This is particularly important for the reason that a person not skilled in the use of moving picture machines is liable to become confused and make mistakes of a serious nature in case of accident.

Objects of this invention are to produce a moving picture machine of great simplicity and cheapness of construction; to produce a machine having a pleasing external appearance; to produce a machine of small weight and bulk; to produce a machine having a simple but accurate framing device; to produce a machine which will successfully advance the film from one picture to the next so quickly that if desired the shutters may be done away with; to produce a machine having a new and greatly improved form of film feeding device which will act with great positiveness and exactness in advancing the film, and to produce a machine of such design and construction that the focal distance between the film and lens may be reduced to a minimum while at the same time retaining sufficient clearance for the shutter or shutters when such are to be used.

Other objects and uses will appear from a detailed description of the invention which consists in the features of construction and combination of parts hereinafter described and claimed.

Figure 2:
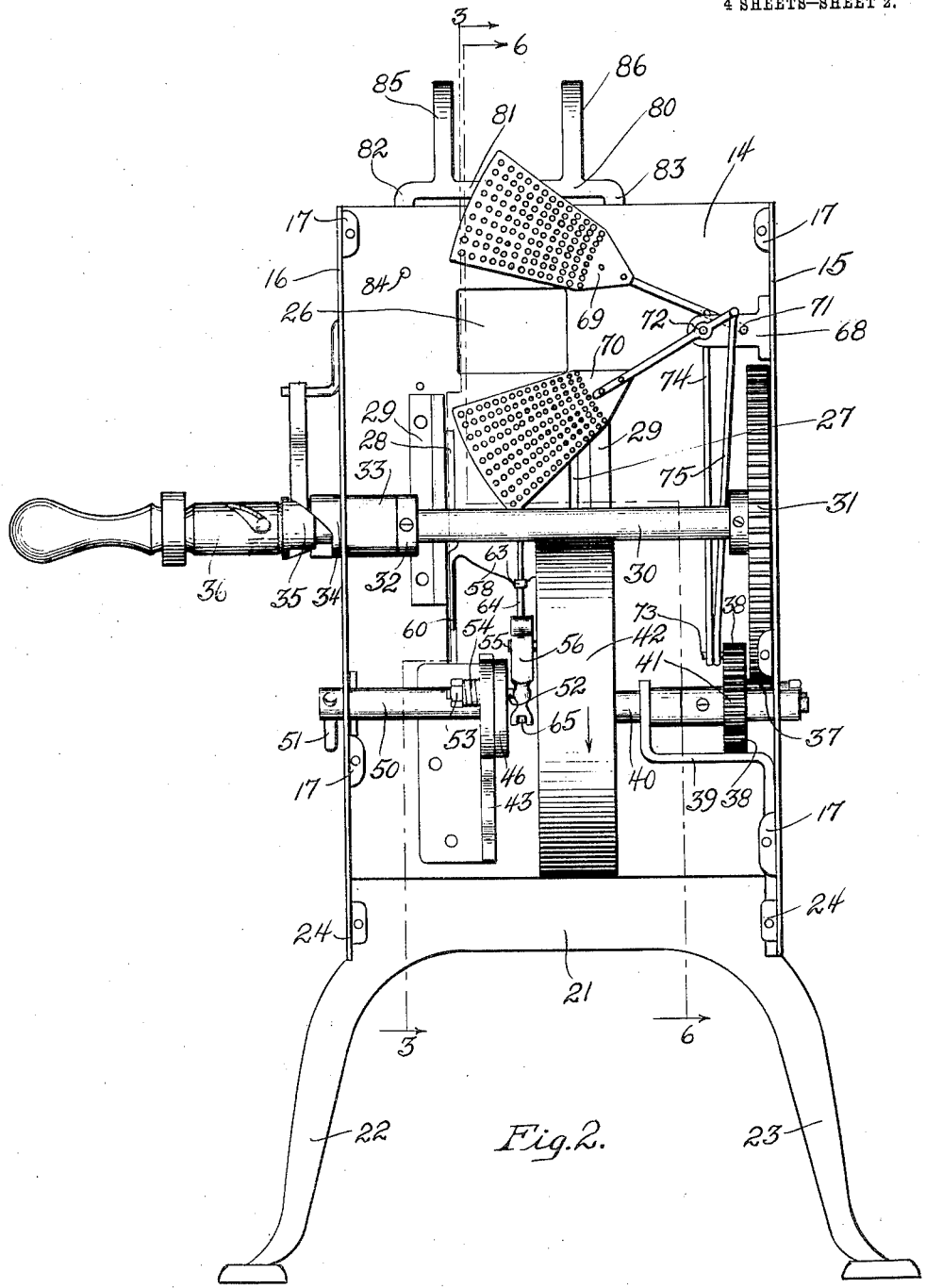

In the drawings Figure 1 shows a view of my improved picture machine looking toward the operating handle side thereof, a portion of the side of the casing being cut away to show the relative locations of the film plate, lens, and shutter within and the legs of the machine being cut away; Fig. 2 shows a back view of my improved machine, the back wall, top and lens being removed, the two shutters being in the open position, and the operating crank being in the disengaged position; Fig. 3 shows a cross section through the machine taken on the line 3—3 of Fig. 2 looking in the direction of the arrows, the back wall, top and lens being removed, the film feeding plate being at the bottom of its feeding stroke, the framing device being thrown into position to frame the film at the highest point and the legs being removed; Fig. 4 is a cross section similar to Fig. 3 the film feeding plate being at the top end of its stroke preparatory to advancing the film and the framing device being in position similar to that of Fig. 3; Fig. 5 is a view similar to Fig. 3 the film feeding plate being at the bottom of the working stroke and the framing device being in position to frame the film at the lowest position; Fig. 6 is a cross section through the machine taken on the line 6—6 of Fig. 2 looking in the direction of the arrows; Fig. 7 is a back detail view of a portion of the front wall of the machine showing the feeding plate and associated parts; Fig. 8 is a cross section taken on the line 8—8 of Fig. 7 showing the feeding plate as it would set during the feeding stroke when thrown outward by the spring and by the force which advances it, for the purpose of feeding the film; and Fig. 9 is a detail view similar to Fig. 8 with the exception however that the film feeding plate is on the return stroke at which time it is thrown inward by the film and by the returning force, against the force of the spring.

In the embodiment of my invention I provide a fly wheel of sufficient weight and inertia to keep the parts running smoothly at all times. On this fly wheel or any other suitable mechanism connected to it I provide a pin. Offset from the center of the wheel which carries the pin I pivot a lever arm provided with a slot for engaging the pin so that as the latter rotates in an engagement with the slot the lever arm will be oscillated back and forth. Owing to the relative positions of the center of the wheel and of the pivot the lever is oscillated in one direction quicker than in the other. The arrangement is what might be termed a quick return mechanism. To the free end of the lever I connect a novel form of feeding plate adapted to engage the film for advancing it on the quick return stroke. In this manner it is fed quickly while the idle stroke is performed slowly. In order to frame the film, that is, to determine the position which it occupies with respect to the lens when at rest, I provide means for raising and lowering the pivotal point of the lever. When desired shutters may be used for cutting off the light from the film during the feeding stroke.

Referring now to the drawings the frame work of my moving picture machine comprises essentially a box shaped body portion. This is in the form of a U-shaped section comprising a front wall 14 and side walls 15 and 16. The side walls are provided with ears 17 to which may be screwed a rear wall 18 of peculiar shape as will be hereinafter described. A top 19 likewise of peculiar shape sets with its lower edges within the walls 14, 15, 16, and 18 and is held in position as by means of screws. The lower portion of the front wall 14 is cut away at 20 to receive the upper side 21 of a U-shaped leg member of which the arms terminate in legs 22 and 23. This leg member is also held in position by means of screws passed into ears 24 of the side walls. Near the rear edge of the side wall 15 I provide another leg 25.

Near its upper portion the front wall is provided with an aperture 26 of slightly greater size than one of the pictures of the film. Approximately in line with the sides of this aperture and below the same the front wall is provided with slots 27 and 28 and adjacent each slot there is provided a Z-shaped rod 29 for the purpose of providing a guide way adjacent each slot of which the use will also be hereinafter described.

Referring now especially to Figs. 2, 3, 4, 5, and 6 I will describe the operating mechanism of my moving picture machine. A driving shaft 30 spans the space between the side walls 15 and 16 and is journaled in them. Near the wall 15 a main gear 31 is secured to the shaft and near the wall 16 a collar 32 is secured to it to prevent its longitudinal movement. This collar abuts against a collar 33 rigidly secured to the side wall 16 and serving also as a journal box. The main shaft 30 projects out beyond the wall 16 sufficiently to make room for a cam block 34 secured to the wall 16 and a cam sleeve 35 which co-acts with said cam block, and still to leave room for a crank sleeve 36 which is journaled on the end of the shaft.

A pinion 37 is journaled adjacent the wall 15 in position to mesh with the gear 31 and is rigidly connected to a gear 38. A bracket 39 is secured to the wall 15 and serves in conjunction with the latter to support a fly wheel shaft 40. The latter is provided with a pinion 41 which meshes with the gear 38 and has one-half as many teeth as the latter so that it makes two revolutions for each revolution of the gear 38. The shaft 40 carries a fly wheel 42 of sufficient size and inertia to keep the parts running smoothly.

A bracket 43 is secured to the front wall of the frame as by means of screws. Its outstanding leg projects outward to a point substantially in line with the shaft 40. It is provided near the forward edge of the fly wheel with substantially vertical slots 44 and 45. An elongated framing plate 46 is pivoted at a point 47 to the bracket and lies in facial contact therewith. At its forward and free end this framing plate is provided with a slot 48 which is engaged by a pin 49 which passes through the slot 44 and is connected to a rock shaft 50. The latter is journaled at its inner end in the outstanding arm of the bracket 43 and its other end passes through the side wall 16 where it is connected to a framing lever 51. Evidently by rotating the latter the framing plate 46 will be raised or lowered as the case may be.

A pivot 52 is rigidly attached to the framing plate with its pivotal end projecting toward the fly wheel. Its other end passes through the slot 45 and is threaded to receive a nut 53 which serves to compress a spring 54 against the bracket arm thus creating a friction between the framing plate and the bracket arm sufficient to hold the former in fixed position with respect to the latter until the framing lever 51 is actuated.

The fly wheel is provided on its face adjacent the framing plate with a pin 55, preferably provided with an anti-friction roller. A lever arm 56 is pivoted on the pin 52 and at its outer end is provided with a slot 57 which engages the pin 55. In normal operation the fly wheel will rotate at a uniform speed in the direction of the arrows of Figs.

2, 3, 4, and 5. In this case it is evident that the slotted end of the lever will be raised more quickly than it will be lowered because on the up-stroke the pin 55 is working on a shorter radius than on the down-stroke. Therefore the inner or unslotted end of the lever will be thrown downward quicker than it is thrown upward, as it oscillates.

I will now describe my improved type of film feeding device.

As heretofore stated the front wall of the frame is provided with vertical slots 27 and 28, adjacent the inner sides of which are provided guide ways in the form of Z-rods 29. My improved film feeding plate is shown particularly in Figs. 7, 8, and 9. It comprises essentially a transverse body portion 58 each end of which is provided with an ear 59 for engaging the guide way formed by the corresponding Z-rod. The body portion 58 is provided at each end with a downwardly projecting film engaging jaw 60 which is provided with one or more teeth 61 whose functions are to engage perforations of the film. When more than one tooth is provided the distances between consecutive teeth should be equal to the distances between consecutive perforations of the film. The horizontal distance between the jaws 60 should be equal to the distance between the rows of perforations of the film so that all of the teeth will properly engage perforations of the film at the same time.

The ears 59 fit loosely within the guide ways so that the film feeding plate can be oscillated back and forth a certain amount with respect to the front of the machine. Near its upper central portion the film feeding plate is provided with a pair of ears 62 and directly beneath the latter there is provided an outstanding perforated guide lug 63. A link 64 passes through the guide lug and its upper end is pivoted between the ears 62 and its lower end is pivoted at 65 to the lever 56.

Obviously as the lever 56 is oscillated by the rotation of the pin 55 the link 64 will be raised slowly and lowered quickly thereby raising the film feeding plate slowly and lowering it quickly also. A leaf spring 66 is attached to the film feeding plate and presses against the link 64 in such a way as to tend to throw the film feeding plate and jaws out in the manner shown in Fig. 8. Examinations of Figs. 8 and 9 in particular will show that the link 64 is pivoted to the ears 62 at a point offset from the center of gravity of the film feeding plate as a whole. Therefore an upward force on the link in the direction of the arrow of Fig. 9 will tend to throw the film feeding plate inward as shown in said figure, thus retracting the teeth 61 within the slots 27 and 28 away from the film. This will permit the plate to be raised into position to engage the film for the next feeding stroke with little or no friction against the film. It will of course be understood that the spring 66 will tend all the while to restore the film feeding plate into the position of Fig. 8 and that in case the upward force on the link alone is not sufficient to throw the jaws inwardly as shown in Fig. 9 any additional force necessary will be derived in the nature of friction of the teeth 61 against the film. This friction will not act detrimentally on the film because the blunt faces of the teeth are on their lower sides.

The front of the machine is provided with a suitable form of door 67 for holding the film flatly and firmly against the front wall of the machine in such a manner that the teeth 61 may properly engage it.

The method of operation of my improved film feeding mechanism is as follows: When the fly wheel has rotated over into position such as to carry the pin 55 downward the arm 56 will be oscillated at a comparatively slow speed to raise its end 65. This will force the link 64 upward thus raising the film feeding plate. A certain force is needed to start the film feeding plate upward. This is an accelerating force and is in addition to the weight of the plate. Therefore at the instant when the mechanism starts to throw the feeding plate upward an excess amount of force will be thrown on the pin which passes through the ears 62 of the plate. This accelerating force will be sufficient to largely overcome the force of the leaf spring and may even entirely overcome it so that on the up-stroke the feeding plate will be thrown inwardly as illustrated in Fig. 9. In case the force is not sufficient to completely overcome the spring the film which is held firmly against the outer surface of the front wall will force the teeth 61 inwardly sufficient to enable them to pass its perforations. In this manner the up-stroke will be commenced. Near the end of the up-stroke it will be necessary to arrest the upward movement of the feeding plate. This will reverse the accelerating force acting upon it and the plate will tend to fly out into the position illustrated in Fig. 8. When the up-stroke has been completed and the down-stroke commenced the pin 55 of the fly wheel will be moving upwardly thus acting on a short radius of the arm 56 to throw its end 65 down and thus lower the film feeding plate. Therefore the latter will be lowered more quickly than it was raised, because the fly wheel is rotating at uniform speed. In jerking the film feeding plate down it must be accelerated at the beginning of the stroke. Therefore the tension on the link 64 will tend to throw the plate out as illustrated in Fig. 8. This force acting in addition to that of the leaf spring will insure that the teeth 61 are thrown out so as to properly engage the perforations of the film at the beginning of the down or feeding stroke. Near the end of this stroke it will be necessary to arrest the motion of the plate and the forces will be reversed which will tend to draw it in again preparatory to disengagement in order to permit it to be raised on the next return stroke. The stroke of this film feeding plate should be slightly in excess of the distance which the film should be fed each time. On the down or feeding stroke the teeth engage the perforations of the film positively. This insures that the film is driven down to exactly the right position. On the up-stroke the plate should rise a trifle higher than the amount the film is to be moved so as to insure that the teeth will properly engage the right perforations when it starts down.

It will be understood that by properly proportioning the parts and properly positioning the pivot 52 with respect to the center of the fly wheel, and by choosing a proper radius in which the pin 55 rotates the feeding stroke may be performed as quickly as desired with respect to the return stroke. In other words, the percentage of total time occupied in feeding the film may be made as small as desired, thus leaving a large amount of time during which the film is at rest.

It is seen that the limits between which the feeding plate oscillates depend upon the vertical position of the pivotal point 52. Herein lies the principle of my improved framing device. In order to frame the film I raise or lower the pivotal point 52 into the proper position. This is accomplished by oscillating the lever 51 up or down thus also moving the plate 46 and raising or lowering the pivot 52. When said pivot is raised to its extreme upper position the film feeding plate will oscillate back and forth within the highest limits. When the pivot is lowered as much as possible the plate will oscillate up and down within the lowest limits. Naturally a certain vibrating force occurs on the pin 52 during operation. This I overcome by the friction between the plate 46 and the bracket arm 43. By tightening the spring 54 sufficiently the arm 46 will not move during operation at high speed. My framing device should be operated while the rest of the machine is in operation. This will insure bringing the film into proper register with the aperture 26.

The slot 45 in which the pin 52 moves should be concentrically located with respect to the pivot 47. It should enable the pin to be raised as much above the pivot 47 as it can be lowered below the same. It will be evident that the distance between the pivot 52 and the center of the fly wheel may change a slight amount as said pivot is raised and lowered in the construction illustrated. This will slightly change the quickness with which the film is advanced but such change is immaterial to satisfactory operation. I contemplate within the scope of my invention any mechanism for raising and lowering the pivotal point 52 and this would include mechanisms in which the distance between the said pivotal point and the center of the fly wheel remain constant.

I will now describe my improved type of aperture shutter when it is desired to use one.

Near the upper portion of the side wall 15 I provide a bracket 68. To this I pivot a pair of shutter screens 69 and 70 which are preferably perforated. The screen 69 is pivoted at a point 71 close to the side wall and the screen 70 is pivoted farther from the side wall at a point 72. The gear 38 is provided with a pin 73. Links 74 and 75 connect the screens 69 and 70 respectively to this pin so that as the gear rotates the links will be simultaneously raised and lowered. Evidently raising both of the links will throw the screens open in opposite directions as illustrated in Fig. 2. Lowering the links half way will bring the two screens into register so that they stand opposite the aperture 26 as shown in Fig. 4. Lowering the links to their lowest position will again uncover the aperture the full amount. Continued rotation of the gear will raise the pin 73 to again close the aperture and finally it will be again uncovered after the gear has made one complete rotation. That is, the aperture will be opened and closed twice during one revolution of the gear. However, the pinion 41 makes two revolutions for each revolution of the gear and therefore the fly wheel will also make two revolutions and the film feeding plate will be raised and lowered twice to correspond with the two openings and closings of the aperture.

By using two screens in the manner illustrated the aperture will be closed simultaneously from both sides toward the center. This will insure a uniform cutting off of the light from the lamp. In like manner the aperture will be uncovered toward both sides from the middle.

Referring now particularly to Figs. 1, 2, 3, 4, and 5 I will describe the arrangement f the upper part of my moving picture machine including the lens. It will be seen that all of the mechanism in the central part of the machine excepting the shutter screens are below the main shaft 30 which passes substantially through the middle of the machine measured in a vertical direction. Therefore practically a clear and unobstructed space is obtained opposite the aperture 26. The shutter screens are located close to the aperture and occupy only a small distance measured from front to rear of the machine. Therefore the rear wall 18 can be brought in closely to the front wall at its upper portion. To this rear wall I attach the stationary portion 76 of the lens, of which the barrel 77 projects inwardly close to the shutter screens as illustrated in Fig. 1. By this construction in which all of the large parts of the machine are placed low down I am enabled to reduce the focal distance between the film and the lens to a minimum amount. This is an important feature for the reason that it has heretofore been difficult to place the moving parts of the machine within the body thereof in such way that the focal distance could be reduced to a very small amount, and still leave room for the lens.

As heretofore stated the rear wall 18 is of peculiar formation. It will be noted by the examination of Figs. 1 to 6 inclusive that all of the large parts of the mechanism lie toward the right of Fig. 2. This enables me to make the side wall 16 comparatively narrow, and in fact as narrow as that part of the machine in which the lens is located. However the main gear 31 and associated parts are located adjacent the side wall 15 so that this must be of greater depth than the wall 16. Reference to Figs. 3, 4, and 5 in particular shows that the fly wheel extends out considerably beyond the gear 31. I make provision for this bulging out the central portion of the rear wall 18 as illustrated in Fig. 1.

I will now describe the mechanism which I use for supporting the film and feeding the same down past the aperture.

A rod 78 is passed vertically down through the bulged part of the rear wall 18 adjacent the fly wheel. This is properly secured at its lower end to prevent movement, and at its upper end carries the film roll 79 in a suitable manner. To the front wall and slightly above the aperture I pivot a film tension device 80 as shown particularly in Figs. 1, 2, 3, and 6. It comprises essentially a cross piece of flexible steel 81 having two downwardly and inwardly curved legs 82 and 83. These are loosely attached to the front wall as by pins 84 so that the tension device is flexibly supported. The cross piece 81 is provided with a pair of rearwardly curved arms 85 and 86 shaped substantially as illustrated in Figs. 1 and 6. The entire tension device is made from thin flexible steel so that it is very springy. The film is passed down in front of the arms 85 and 86 as shown in Fig. 1. At the instant of the feeding stroke the film is jerked downward thus taking up its slack and bending the tension device over into the dotted line position of Figs. 1 and 6. A force is thus exerted on the film and the tension device is placed under strain but the film roll 79 is not jerked suddenly, there being sufficient flexibility in the tension device to supply the amount of film necessary for one feeding stroke. As soon as the feeding stroke is complete and the film is again at rest in front of the aperture the tension device is exerting a uniform force on the film and this will move the film roll sufficiently to supply enough film for the next feeding stroke. Of course in operation the film roll will be rotating at practically a uniform speed but the sudden jerks on the film will be taken up by the tension device. Thus the film is relieved of undue strain and smooth operation is insured.

I claim:

1. In a moving picture machine, the combination of a moving part, means for rotating the same, a lever having its pivot laterally displaced with respect to the center line of rotation of the moving part, a pin on the moving part for engaging one arm of the lever to oscillate the same, a film feeding device connected to the lever in a manner to be oscillated thereby for feeding the film, and means for raising and lowering the pivotal point of the lever in a manner to determine the upper and lower limits of oscillation of the film feeding device for framing the film, substantially as described.

2. In a moving picture machine, the combination of a moving part, means for rotating the same, a lever having its pivot laterally displaced with respect to the center line of rotation of the moving part, a pin on the moving part for engaging one arm of the lever to oscillate the same, a film feeding device connected to the lever in a manner to be oscillated thereby for feeding the film, an arm pivoted at a point in the center line of rotation of the moving part and carrying the oscillatable lever pivot, and means for swinging the last mentioned arm to raise and lower the oscillatable lever pivot in a manner to determine the upper and lower limits of oscillation of the film feeding device for framing the film, substantially as described.

3. In a moving picture machine, the combination of a moving part, means for rotating the same, a bracket arm fixed to an immovable part of the machine, an arm pivoted to the bracket, means for raising and lowering said arm, and means for holding the arm in raised or lowered position, a lever pivoted to the arm with its pivot laterally displaced from the center line of rotation of the moving part, a pin on the moving part for engaging the arm to oscillate the same, and a film feeding device attached to the lever in a manner to be oscillated thereby for feeding the film, substantially as described.

4. In a moving picture machine, the combination of a bracket secured to the stationary portion of the machine and provided with a substantially vertical slot, an oscillatable arm pivoted to the bracket and provided with a laterally projecting pin in register with the slot of the bracket, a spring tension means on the pin for holding the arm in frictional engagement with the bracket, an oscillatable lever arm suitably pivoted to the first mentioned arm, and means for raising and lowering the first-mentioned arm to raise and lower the pivotal point of the oscillatable lever arm, substantially as described.

5. In a moving picture machine, the combination of a bracket suitably secured to a stationary portion of the machine, and provided with a substantially vertical slot, an adjustment arm pivoted to the stationary bracket and provided at its free end with a longitudinal slot, an oscillatable lever suitably pivoted to the adjustment arm, and a framing crank engaging the longitudinal slot of the adjustment arm for raising and lowering the latter to raise and lower the pivotal point of the lever, substantially as described.

6. In a moving picture machine, provided in its front wall with a pair of vertical slots, guideways on the inside face of said wall and adjacent the outer edges of the slots, a film feeding plate provided with a pair of downwardly extending jaws, each having a film perforation engaging tooth adapted to extend through the slot, a lug on each side of the plate adapted to engage the corresponding guideway to maintain the plate in proper relation with the front wall of the machine, a lug on the upper portion of the plate extending inwardly and away from the wall, and suitable mechanism connected to the lug for vibrating the plate up and down to feed the film, substantially as described.

7. In a moving picture machine, the combination of a lever, a film feeding device attached to one arm thereof, means for oscillating the lever about its pivot to oscillate the film feeding device for feeding the film, said means for oscillating having a fixed driving center, and means for shifting the pivotal point of the lever in a direction parallel to the direction of film feed in a manner to frame the film, substantially as described.

8. In a moving picture machine, the combination of an oscillatory lever, a film feeding device attached to one arm thereof, means for oscillating the lever in a manner to oscillate the film feeding device for feeding the film, said means for oscillating having a fixed driving center, and means for raising and lowering the pivotal point of the lever for framing the film, substantially as described.

9. In a moving picture machine, the combination of a lever, a film feeding device attached to one arm thereof, means for oscillating the lever about its pivot to oscillate the film feeding device to feed the film, said means for oscillating having a fixed driving center, and means for shifting the pivotal point of the lever in a direction substantially at right angles to the direction of its length, substantially as described.

EDWARD H. SPERBERG.

Witnesses:
   Thomas A. Banning, Jr.,
   Ephraim Banning.